United States Patent [19]

Yamada

[11] 4,047,212
[45] Sept. 6, 1977

[54] DIAPHRAGM BLADE FOR CAMERAS AND METHOD OF MAKING THE SAME

[75] Inventor: Misao Yamada, Tokyo, Japan

[73] Assignee: Copal Company Limited, Tokyo, Japan

[21] Appl. No.: 655,016

[22] Filed: Feb. 4, 1976

[30] Foreign Application Priority Data

Feb. 6, 1975    Japan .................................. 50-15715

[51] Int. Cl.² ............................................. G03B 9/02
[52] U.S. Cl. .................................................. 354/270
[58] Field of Search ................... 354/270, 274, 40, 42; 352/141; 350/206, 266, 271, 272

[56] References Cited

U.S. PATENT DOCUMENTS

| 2,380,216 | 7/1945 | Carter | 354/270 |
| 3,116,673 | 1/1964 | Bogopolsky | 354/42 |
| 3,651,748 | 3/1972 | Yoshiada | 352/141 X |
| 3,846,807 | 11/1974 | Sekine | 354/42 |
| 3,935,581 | 1/1976 | Starp | 354/270 |

FOREIGN PATENT DOCUMENTS

| 656,296 | 1/1963 | Canada | 354/42 |

*Primary Examiner*—Donald A. Griffin
*Attorney, Agent, or Firm*—Cushman, Darby & Cushman

[57] ABSTRACT

A diaphragm blade for cameras comprising an opaque blade portion and a filter portion. This diaphragm blade is made by forming a blade portion by depositing a light intercepting substance on a sheet made of a filter material and then cutting the blade portion as including the filter portion off the sheet so that a high quality diaphragm blade having an integral filter may be obtained at a low cost.

9 Claims, 9 Drawing Figures

DIAPHRAGM BLADE FOR CAMERAS AND METHOD OF MAKING THE SAME

BACKGROUND OF THE INVENTION a. Field of the Invention

The present invention relates to a diaphragm blade for cameras and a method of making the same.

b. Description of the Prior Art

There has recently appeared, for example, an 8 m/m cinecamera which can photograph with a proper exposure even a comparatively dark object to be photographed. This is due to the facts that a shutter of a large opening angle (for example, a maximum opening angle of 230°) has been developed, that a large aperture lens (for example, of F 1.1) has been developed and that a high sensitivity film (for example, of an ASA sensitivity of 200) has been developed. However, this kind of high performance camera, is complicated and if costs are to be kept reasonable, it is not advisable in the cost to vary the shutter opening angle as operatively connected with the diaphragm aperture. Therefore, there is generally used a variable shutter opening angle system wherein the shutter opening angle is made constant and the diaphragm is varied. In the case of such system, in order to make a proper exposure photographing under a high illumination condition, the diaphragm aperture must be made so small as to be of F 32 to 45. For example, in this kind of camera, a proper exposure is possible until the object illumination is above Lv 16 but, under such high illumination condition as of an object illumination of about Lv 16, unless the diaphragm aperture is made less than 0.5 mm., no photographing will be able to be made with a proper exposure. Therefore, it is necessary to design a diaphragm aperture which can be set to be very small. However, there have been defects that, if the aperture is made too small, a diffraction will be produced and have a bad influence on the focused picture quality on the film and a very high working precision will be required in manufacture. In such case, in order to improve the diaphragm precision, as shown in FIG. 1, a deep incision 1a is made in the diaphragm blade 1 so that, when this incision 1a advances into the exposure aperture 2, the movement of the diaphragm blade 1 may be large. However, there have been defects that, if the diaphragm blade is so formed, the strenth of the blade will be reduced so much that the blade will not be kept flat and the shape of the diaphragm aperture will be complicated that the focused picture quality on the film will be reduced.

Therefore, it is known that, when it is necessary to set the diaphragm aperture to be small in order to eliminate such defects as are described above, such light reducing member as, for example, a neutral density filter (which shall be referred to as an ND filter hereinafter) will be inserted into the aperture 2 so that, even though the actual diaphragm aperture is large, the amount of light reaching the film may be equivalent to that through any desired small diaphragm aperture.

There are the following two methods for such case. One of them is a method wherein, when the diaphragm aperture becomes smaller than a certain size, an independent light reducing member will be inserted into the aperture 2 by an electric or mechanical operation.

The other is a method wherein a light reducing member is secured in advance to a part on the side determining the diaphragm aperture of the diaphragm blade so that the area advancing into the aperture 2 of the light reducing member may be varied by the moving position of the diaphragm blade.

An example of the case by the electric operation in the former method is shown in FIG. 2. In such case, when a diaphragm blade 3 is rotated around a fulcrum pin 5 as a center by the movement in the direction indicated by the arrow of a driving pin 4 and the diaphragm aperture becomes smaller than a certain value for the exposure aperture 2, a switch piece 3' integral with the diaphragm blade 3 will contact a switch piece 6, a signal will be given to a setting terminal S of a flip-flop FF, the flip-flop FF will be set, a magnet 7 will be energized, a filter holder 8 will be attracted against a spring 9 and an ND filter 8a will cover the exposure aperture 2 (See the position shown by the one-point chain line). When the diaphragm aperture becomes maximum, the switch piece 6' will now contact a switch piece 3', a signal will be given to a resetting terminal R of the flip-flop FF, the flip-flop will be reset, the magnet 7 will be de-energized and the filter holder 8 will be moved by the spring 9 so that the filter 8a may retreat from the exposure aperture 2.

Examples of the case by the latter method are shown in FIGS. 3 and 4. FIG. 3 is of the case of a system of measuring the light passing through a photographing lens wherein an ND filter 11 is secured by bonding or calking to a part of a diaphragm blade 10 so that, with the rotation of the diaphragm blade 10, the ND filter 11 may advance into the exposure aperture 2 and the same amount of light as substantially through a very small diaphragm aperture may reach the film. FIG. 4 is of the case of a system of directly measuring the light from an object to be photographed wherein reference numeral 2a represents an aperture for a photographing light path, numeral 2b represents an aperture for a light measuring light path and ND filters 13 and 14 are fitted in the same manner to the parts corresponding to the respective exposure apertures of a diaphragm blade 12 so that the same effect as in the case of FIG. 3 above may be developed.

However, in the case of FIG. 2, as the filter 8a is put into and out of the exposure aperture 2 by an electric means, a current source will be required and the component parts will be so many that it will be disadvantageous to make the structure small. In the case of FIG. 3, it will be difficult to obtain a precision in fixing such light reducing member as the ND filter 11 to the diaphragm blade 10, care will have to be taken in handling the ND filter in respect of dirts and flaws and, as the materials and thermal expansion coefficients of the diaphragm blade 10 and ND filter 11 are respectively different from each other, the diaphragm blade will be difficult to keep flat. Further, in the case of such light measuring system as in FIG. 4, in respect that there is no loss of the light to the film, in a camera which can photograph a low illumination object, it will be superior to the light measuring system shown in FIG. 3 but there have been defects that it will be necessary to very strictly determine the relative positions of the two ND filters to be secured to the diaphragm blade 12 and the cost of the manufacture will be high.

SUMMARY OF THE INVENTION

A primary object of the present invention is to provide a diaphragm blade having a filter wherein such defects as are mentioned above are eliminated.

Another object of the present invention is to provide a method of making diaphragm blades wherein a high quality diaphragm blade having a filter in which the filter fitting position is accurately regulated can be made at a low cost.

These and other objects of the present invention will become more apparent during the course of the following detailed description and appended claims.

DESCRIPTION OF THE PREFERRED EMBODIMENTS

Figure 1:
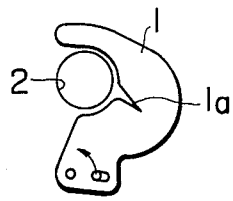
FIG. 1 is a plan view showing a conventional diaphragm blade designed so that even a very small diaphragm aperture may be set.
Figure 2:
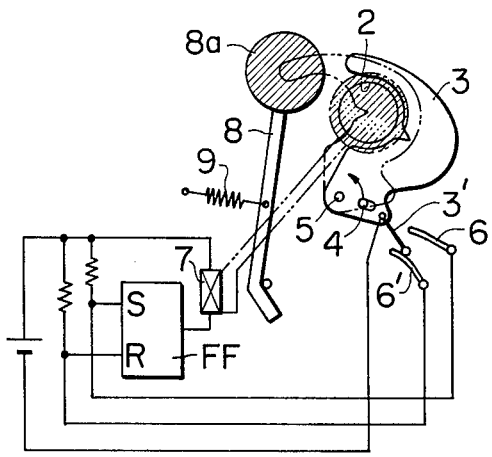
FIG. 2 is an explanatory view showing a conventional diaphragm controlling apparatus wherein, when the diaphragm aperture becomes smaller than a certain value, a filter provided separately from the diaphragm blade will be inserted into the photographing light path so that substantially the same amount of light as in the case of setting the diaphragm aperture to be very small may reach the film surface.
Figure 3:
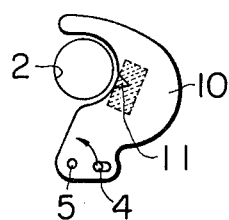
FIGS. 3 and 4 are plan views showing respectively two different conventional diaphragm blades fitted with filters wherein, when the diaphragm aperture becomes smaller than a certain value, the exposure aperture will be completely covered with a filter so that substantially the same amount of light as in the case of setting the diaphragm aperture to be very small may reach the film surface.
Figure 4:
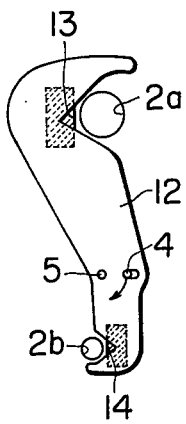
Figure 5:
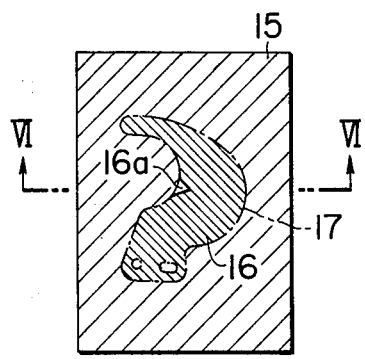
FIGS. 5 and 7 are plan views showing manufacturing processes in the case of making by the present invention the diaphragm blades having filters of the types shown respectively in FIGS. 3 and 4.
Figure 7:
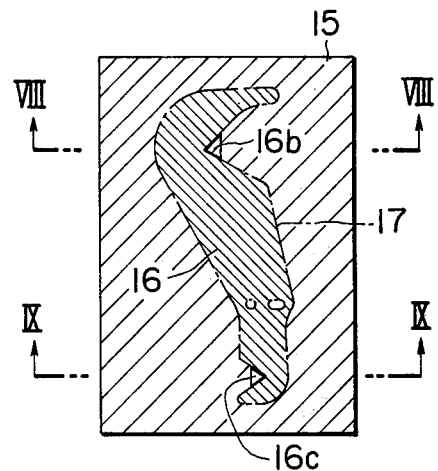
Figure 8:
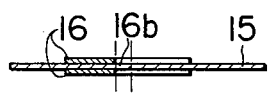
FIGS. 8 and 9 are sectioned views respectively on lines VIII — VIII and IX — IX in FIG. 7.
Figure 6:
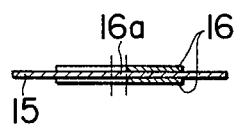
FIG. 6 is a sectioned view on line VI — VI in FIG. 5.
Figure 9:
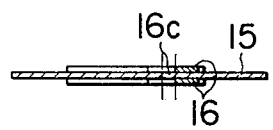

FIG. 5 shows an embodiment applying the present invention to obtain a diaphragm blade of the type shown in FIG. 3. FIG. 7 shows an embodiment applying the present invention to obtain a diaphragm blade of the type shown in FIG. 4. FIG. 6 shows a sectioned view on line VI — VI in FIG. 5. FIGS. 8 and 9 show sectioned views respectively on lines VIII — VIII and IX — IX in FIG. 7.

In FIGS. 5 to 9, reference numeral 15 represents an ND filter sheet (for example, a triacetate sheet). Numeral 16 represents a diaphragm blade portion formed by depositing a light intercepting substance on the sheet 15 by a painting, printing or evaporatively depositing means. The one-point chain line shown by numeral 17 represents the outline of the diaphragm blade portion 16 to be cut off after the above mentioned treatment.

Therefore, if a light intercepting substance is applied by printing in the same position, for example, on both surfaces to the blade portion 16 (the right downwardly hatched part) on the ND filter sheet 15 and is cut off along the one-point chain line 17, there will be obtained a diaphragm blade formed integrally of the opaque blade portion 16 and the filter portion 16a (16b, 16c) acting to reduce the amount of the passing light.

By the way, in the above described embodiment, there is shown the case of forming the opaque portion 16 by physically depositing the light intercepting substance on the ND filter sheet 15. However, the opaque portion may be formed by chemically treating the ND filter sheet by painting it with a photosensitive substance in advance or by chemically blackening and etching it by evaporatively depositing a metal. Further, in the above mentioned embodiment, there is shown the case of depositing the light intercepting substance on both surfaces of the sheet in oder to eliminate the lack of the flatness by the temperature fluctuation. However, depending on the case, only one surface may be treated. The light reducing rate of the filter portion to be used may be uniform on the entire surface, may gradually vary from one end to the other of the entire surface or may vary in step.

I claim:

1. A diaphragm blade for cameras comprising an ND filter sheet, a blade portion formed by depositing a light intercepting substance on said sheet, and a filter portion integral with said blade portion so as to be effective within a small diaphragm range between F32 and F45.

2. A diaphragm blade for cameras according to claim 1 wherein said ND filter sheet is a triacetate sheet.

3. A diaphragm blade for cameras according to claim 1 wherein said light intercepting substance is deposited on one surface of said sheet.

4. A diaphragm blade for cameras according to claim 1 wherein said light intercepting substance is deposited on both surfaces of said sheet.

5. A diaphragm blade for cameras according to claim 1 wherein said light intercepting substance is deposited by painting on said sheet.

6. A diaphragm blade for cameras according to claim 1 wherein said light intercepting substance is deposited by printing on said sheet.

7. A diaphragm blade for cameras according to claim 1 wherein said light intercepting substance is deposited by evaporatively depositing on said sheet.

8. A diaphragm blade for cameras according to claim 1, wherein the light passing rate of said filter portion varies.

9. A diaphragm blade for cameras comprising an ND filter sheet, a blade portion formed by depositing a light intercepting substance on said sheet, and a filter portion integral with said blade portion so as to be effective within a small diaphragm range.

* * * * *